United States Patent [19]

Bron

[11] Patent Number: 4,889,202

[45] Date of Patent: Dec. 26, 1989

[54] AIRCRAFT LANDING GEAR MAINTENANCE AND WEIGHING SYSTEM

[76] Inventor: Raymond Bron, 17282 Mt. Wynne Cir., Fountain Valley, Calif. 92708

[21] Appl. No.: 226,689

[22] Filed: Aug. 1, 1988

[51] Int. Cl.[4] .................. G01G 19/02; G01G 19/52
[52] U.S. Cl. ................................ 177/134; 177/146; 177/199
[58] Field of Search ............... 177/134, 146, 199, 200, 177/255

[56] References Cited

U.S. PATENT DOCUMENTS

| | | | |
|---|---|---|---|
| 2,819,612 | 1/1958 | Borgstrom et al. | 177/134 X |
| 3,191,442 | 6/1965 | Hutchinson | 177/134 X |
| 4,261,428 | 4/1981 | Bradley | 177/255 X |
| 4,385,527 | 5/1983 | Raskin | 177/146 X |
| 4,540,058 | 10/1985 | Kremer et al. | 177/255 |

*Primary Examiner*—George H. Miller, Jr.
*Attorney, Agent, or Firm*—Fulwider, Patton, Rieber, Lee & Utecht

[57] ABSTRACT

A weighing table system in which load cells are disposed between support columns and the load-supporting platform. The load cells are isolated from torsional forces applied to the columns by hub members enclosing the tops of each of the columns. The horizontal top surfaces of the hub members directly support the load cells. The hub member is interconnected with the column for rotation therewith. A pair of arm members perpendicular to each other have inner ends which are fixed to the hub member and extend horizontally outwardly. Rigid horizontal tie-rods have ends affixed to each of the other ends of the tie-rods are fixed to brackets carried by the platform.

In a preferred embodiment, horizontal rollers are journaled for rotation in the outer ends of each of the arm members, to contact abutting bearing vertical surfaces and transmit transverse horizontal loads to the hub member. A rigid horizontal tie-rod has one end affixed to the hub and the other end fixed to the platform to transmit the transverse forces to the platform.

5 Claims, 3 Drawing Sheets

AIRCRAFT LANDING GEAR MAINTENANCE AND WEIGHING SYSTEM

This invention relates to systems.

More particularly, the invention pertains to an improved combination maintenance elevator and weighing system specially adapted for use in connection with services and monitoring the total weight and weight distribution of aircraft.

In still another respect, the invention pertains to a weighing system utilizing load cells which support a weighing platform in which the load cells are insulated from torsional forces.

According to still another and more particular aspect, the invention relates to such an improved load cell/platform weighing system in which the load cells are also insulated from transverse forces acting on the platform.

Systems for maintaining aircraft, especially large modern "heavy" aircraft such as wide-body jets, generally include landing gear maintenance elevators operating in wells located in the maintenance hangar floor. Each of these elevators is constructed to support the weight of one of the landing gear trucks of the aircraft. The aircraft is wheeled into the maintenance hangar and placed so that each of the landing gear trucks is supported by one of these separate elevators. Thereafter, the elevators can be controllably raised and lowered, either independently or simultaneously to facilitate maintenance and repair of the landing gear and other components of the aircraft (engines, etc.).

It is also known to provide special apparatus associated with each of the elevators to measure the vertical forces transmitted from the aircraft, into the landing gear to the elevator platform. In this way, by measuring the weight carried by each elevator, the total weight of the aircraft can be measured as well as the weight distributed on each of the landing gear trucks.

As will be appreciated, the elevator structures and associated weighing equipment are necessarily massive to handle the loads of several hundred thousand pounds which may be exerted by the loaded aircraft. However, in order that the weights be measured with the required accuracy, e.g., within twenty-five to fifty pounds, it is necessary to construct these massive components in such a way as to either eliminate or be able to "zero out" extraneous forces which would interfere with the measurement of the vertically applied aircraft weight forces acting on the elevator platforms.

Accordingly, the principal object of the invention is to provide an improved weighing table system which is especially adapted for use in connection with aircraft landing gear maintenance elevators.

Yet another object of the invention is to provide such improved weighing platform systems which are simply constructed and have minimum maintenance requirements.

Still another object of the invention is to provide such weighing table systems of improved accuracy and reliability.

These, other and further objects and advantages will be apparent to those skilled in the art from the following detailed description thereof, taken in conjunction with the drawings in which.

Figure 1:
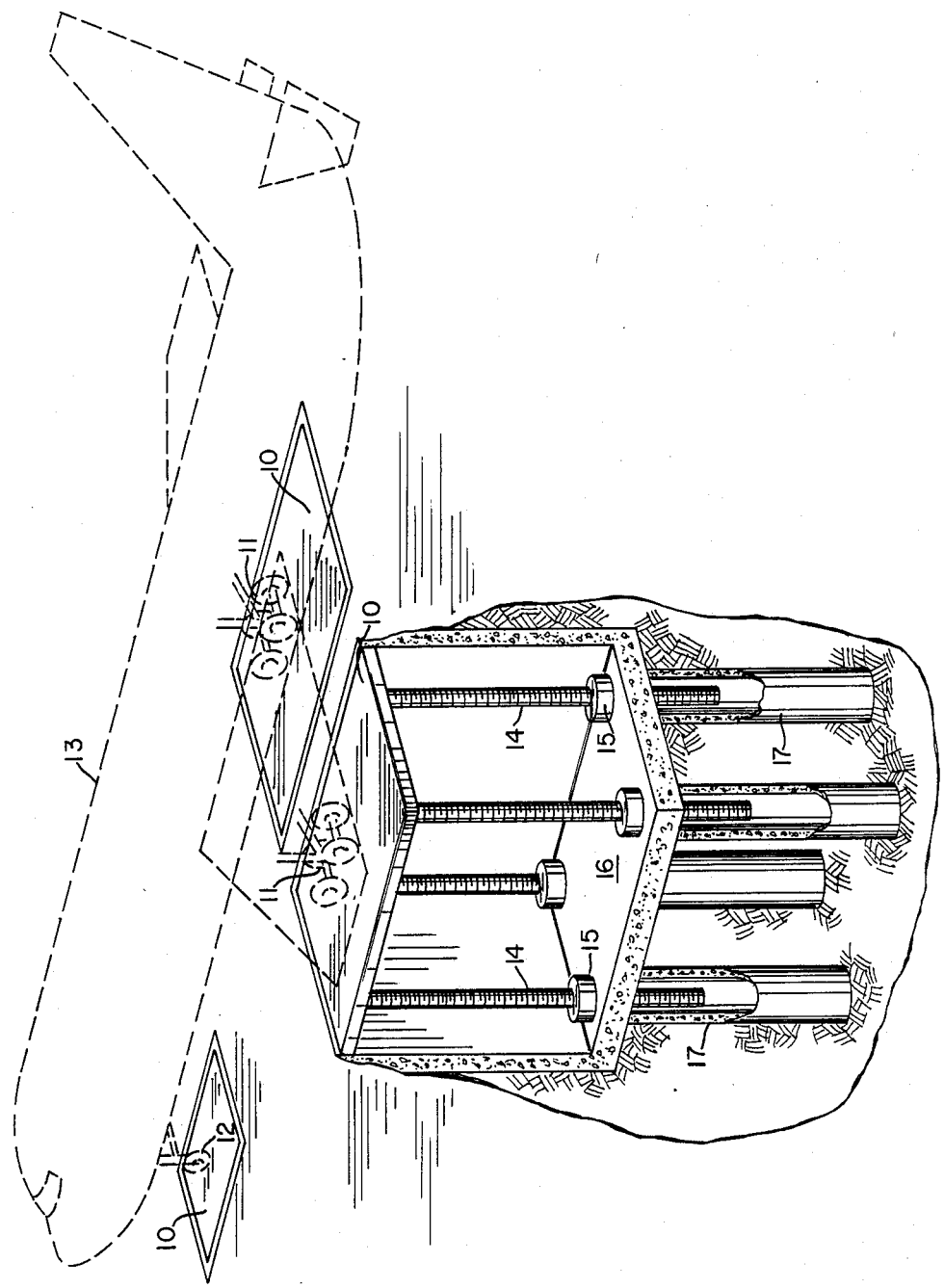
FIG. 1 is a prospective view of a typical aircraft service area, illustrating the application of the principles of the present invention in serving and weighing a conventional heavy aircraft (shown by dashed lines)

Turning now to the drawings, in which like referenced characters depict the same elements in the several views, FIG. 1 generally illustrates an aircraft weighing and service elevator system which consists of separate load-bearing elevator platforms 10, each positioned to independently carry the weight exerted by the main landing gear trucks 11 and nose gear truck 12 of a conventional modern "heavy" aircraft indicated by the dashed lines 13. The elevator platforms 10 are supported by a plurality of screw columns 14 by motor driven gears 15 located in the bottom of the elevator pit 16. The screw columns 14 operate in wells 17 recessed below the floor level of the elevator pit 16.

The motors 15 are controlled simultaneously or independently during service operations to provide the desirable jacking effect on the landing gear trucks 11 and 12.

Figure 2:
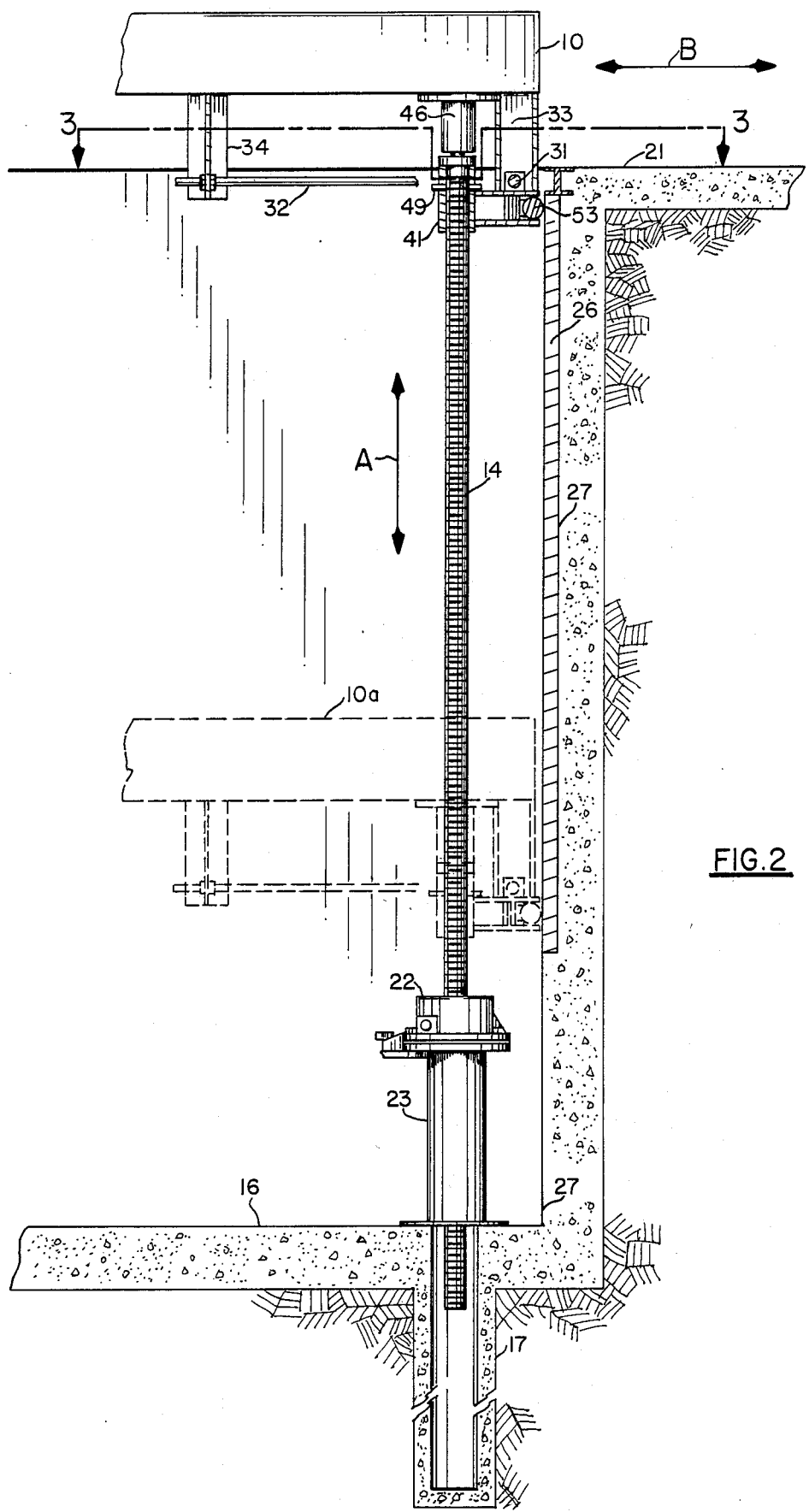
FIG. 2 is a partial sectional view of one of the elevator wells and the installed elevator and weighing system of the invention.

As depicted in greater detail in FIG. 2, the elevator pit 16 is sized to accommodate the platform 10 such that it can be raised to the position shown (above the floor level 21 of the maintenance area) to a position indicated by dashed lines 10a below the floor level 21. Raising and lowering of the platform 10 is accomplished by a horizontally rotatable gear driven nut (not shown) located in a gear box 22 carried on a support 23. A threaded support column 14 is moved upwardly and downwardly as indicated by the arrow A by rotation of the nut within the gear box 15. Transverse loads on the platform, e.g., in the direction of the arrow B, are transmitted to bearing channels 26 located in the side walls 27 of the pit 16.

Figure 4:
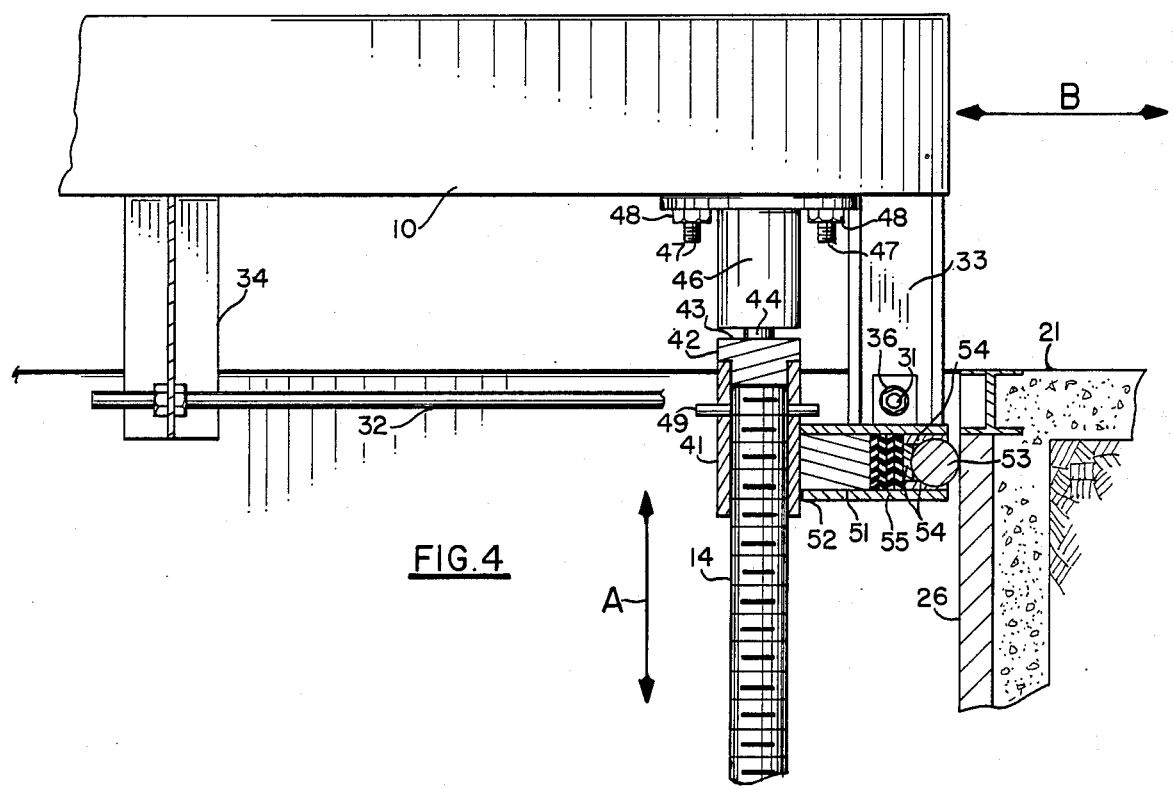
FIG. 4 is a sectional view of the load cell stabilization system of FIG. 3, taken along section line 4—4 thereof.

Referring now more specifically to FIG. 4, the upper end of the threaded support column 14 is enclosed by a hub 41 having a cap portion 42 provided with an upper surface 43 which is machined to be perfectly flat. The surface 43 directly contacts the lower bearing element 44 of a conventional load cell 46 which is attached by means of threaded studs 47 and nuts 48 to the underside of the platform 10. The screw column 14 is prevented from rotating within the hub 41 by means of a pin 49 extending through the column 14 and the side walls of the hub 41.

Arm member 51, the inner end 52 of which is affixed to the hub 41 extends outwardly toward the bearing surface 26 of the vertical side wall 27. A steel roller 53 is journaled for rotation in aluminum pillow blocks 54 carried in the outer end of the arm 51. The roller 53 contacts vertical bearing channel 26 inset into the side wall 27 of the elevator pit 16. The pillow blocks 54 are backed up by rubber shock absorbing members 55 to absorb impact loads between the roller bearing 53 and the bearing channel 26.

Figure 3:
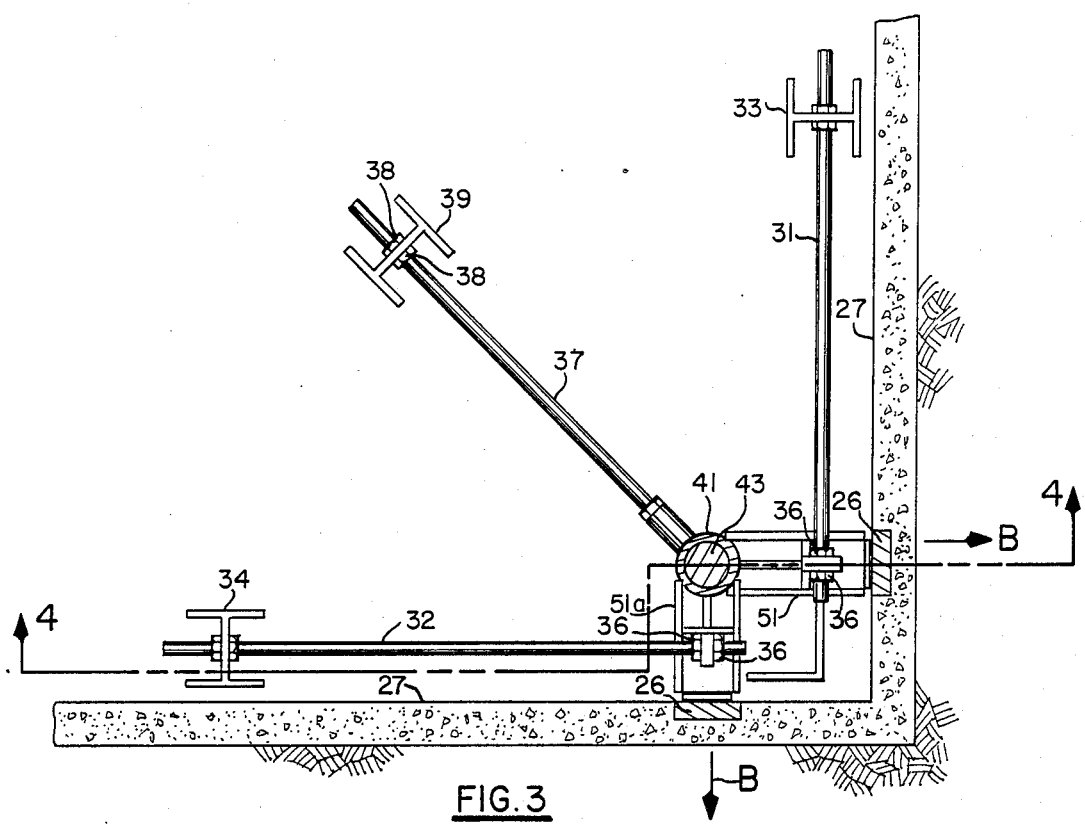
FIG. 3 is a plan view of the load cell stabilization system of the apparatus of FIG. 2 at line 3—3 thereof.

Turning to FIG. 3, torsional forces acting on the hub of 41 are counteracted by tie-rods 31 and 32 extending between brackets 33 and 34 depending from the underside of the platform 10. The other ends of the tie-roads 31 and 32 are adjustably affixed by nuts 36 to perpendicularly oriented arms 51 and 51a at points spaced outwardly from the hub 41.

Transverse loads in the direction of the arrows B are applied to the hub 41 through the arms 51 and 51a and are resisted by tie-rods 37 attached at one end to the hub 41 and adjustably fixed at the other end by nuts 38 to bracket 39 depending from the underside of the platform 10.

Having described my invention in such terms as to enable those skilled in the art to understand and practice it, and having identified the presently preferred embodiments thereof, I claim:

1. In a weighing table system which includes
a horizontal load-supporting platform,
column member means for supporting said platform, and
load cell means disposed between said columns and said platform,
the improvements for isolating said load cells from torsional forces applied to said columns, comprising:
 (a) a hub member enclosing the top of each said column, the horizontal top surface of which directly supports one of said load cells;
 (b) means interconnecting said hub member and top of said column for rotation thereof around the longitudinal axis of said column;
 (c) an arm member, the inner end of which is affixed to said hub member and extending outwardly therefrom;
 (d) a rigid horizontal tie-rod having one end thereof affixed to said arm at a point spaced horizontally from said hub; and
 (e) bracket means carried by said platform for fixably locating the other end of said tie-rod.

2. The weighing table system of claim 1 further includes:
 (a) horizontal rollers, journaled for rotation in the outer end of said arm member for contacting an abutting vertical bearing surface to transmit transverse loads to said hub member; and
 (b) a second rigid horizontal tie-rod having one end fixed to said hub and the other end thereof fixed to said platform.

3. In a weighing table system which includes
a horizontal load-supporting platform,
column member means for supporting said platform, and
load cell means disposed between said columns and said platform,
the improvements including:
 (a) column members having upper and lower ends, upper ends of which support said platform and lower ends of which extend into wells formed below said platform; and
 (b) means operatively associated with said column members for raising and lowering said platform by reciprocating said lower ends of said columns within said wells.

4. The weighing table of claim 3, further comprising means for isolating said horizontal load-supporting platform from horizontal and torsional forces applied to said column members.

5. The weighing table of claim 4 wherein said isolating means comprises: means for transferring horizontal and torsional loads applied to said column members to the walls of said well whereby vertical loads measured by said load cell means remain uneffected by application of said horizontal and torsional forces to the column members.

* * * * *

UNITED STATES PATENT AND TRADEMARK OFFICE
CERTIFICATE OF CORRECTION

PATENT NO. : 4,889,202

DATED : December 26, 1989

INVENTOR(S) : Raymond Born

It is certified that error appears in the above-identified patent and that said Letters Patent is hereby corrected as shown below:

On the title page, under item [19] and in item [76], replace "Bron" with --Born--.

Signed and Sealed this

Eleventh Day of December, 1990

Attest:

HARRY F. MANBECK, JR.

*Attesting Officer*     *Commissioner of Patents and Trademarks*